United States Patent
Yang et al.

(10) Patent No.: US 9,917,329 B2
(45) Date of Patent: Mar. 13, 2018

(54) FLUORINATED ELECTROLYTES WITH NITRILE GROUPS

(71) Applicant: Seeo, Inc, Hayward, CA (US)

(72) Inventors: Jin Yang, Pleasanton, CA (US); Kulandaivelu Sivanandan, Fremont, CA (US); Xiao-Liang Wang, San Leandro, CA (US); Hany Basam Eitouni, Oakland, CA (US); Steven Lam, San Jose, CA (US)

(73) Assignee: Seeo, Inc., Hayward, CA (US)

( * ) Notice: Subject to any disclaimer, the term of this patent is extended or adjusted under 35 U.S.C. 154(b) by 16 days.

(21) Appl. No.: 15/164,662

(22) Filed: May 25, 2016

(65) Prior Publication Data

US 2017/0331155 A1 Nov. 16, 2017

(51) Int. Cl.
| | |
|---|---|
| *H01M 4/131* | (2010.01) |
| *H01M 10/0569* | (2010.01) |
| *H01M 10/0525* | (2010.01) |
| *H01M 4/134* | (2010.01) |
| *H01M 4/136* | (2010.01) |
| *H01M 4/02* | (2006.01) |

(52) U.S. Cl.
CPC ....... *H01M 10/0569* (2013.01); *H01M 4/131* (2013.01); *H01M 4/134* (2013.01); *H01M 4/136* (2013.01); *H01M 10/0525* (2013.01); *H01M 2004/027* (2013.01); *H01M 2004/028* (2013.01)

(58) Field of Classification Search
CPC .. H01M 4/131; H01M 10/0569; H01M 4/134; H01M 4/136; H01M 10/0525; H01M 2004/027; H01M 2004/028
See application file for complete search history.

(56) References Cited

U.S. PATENT DOCUMENTS

| | | |
|---|---|---|
| 3,821,297 A | 6/1974 | Resnick |
| 8,067,114 B2 | 11/2011 | Kim et al. |
| 9,368,775 B2 | 6/2016 | Visco et al. |
| 2002/0110739 A1 | 8/2002 | McEwen et al. |
| 2002/0127475 A1* | 9/2002 | Marchionni .......... C07C 309/10 429/324 |
| 2003/0049538 A1 | 3/2003 | Buerger et al. |
| 2003/0108800 A1 | 6/2003 | Barbarich |
| 2003/0181572 A1 | 9/2003 | Tan et al. |

(Continued)

FOREIGN PATENT DOCUMENTS

| | | |
|---|---|---|
| JP | 2009206004 A | 9/2009 |
| WO | 2007142731 A2 | 12/2007 |

(Continued)

OTHER PUBLICATIONS

International Search Report for PCT/US16/31685, dated Aug. 16, 2016.

(Continued)

*Primary Examiner* — Alex Usyatinsky

(74) *Attorney, Agent, or Firm* — R'Sue Popowich Caron

(57) ABSTRACT

Perfluoropolyether electrolytes have either one or two terminal nitrile groups and an alkali metal salt. The alkali metal salt can be a lithium salt, a sodium salt, a potassium salt, or a cesium salt. The salt can make up between 5 and 30 wt % of the electrolyte composition. Such electrolytes have shown high ionic conductivities, making them useful as lithium cell electrolytes.

13 Claims, 3 Drawing Sheets

(56) References Cited

U.S. PATENT DOCUMENTS

| | | |
|---|---|---|
| 2004/0043298 A1 | 3/2004 | Lee |
| 2004/0170901 A1 | 9/2004 | Blau et al. |
| 2005/0287441 A1 | 12/2005 | Passerini et al. |
| 2006/0035987 A1 | 2/2006 | Paddison |
| 2006/0127766 A1 | 6/2006 | Yamate |
| 2007/0178133 A1 | 8/2007 | Rolland |
| 2008/0114143 A1 | 5/2008 | Brothers et al. |
| 2009/0004568 A1* | 1/2009 | Hirose ............... H01M 2/0285 429/221 |
| 2009/0023038 A1 | 1/2009 | DeSimone et al. |
| 2009/0029249 A1* | 1/2009 | Takami ............... H01M 4/366 429/188 |
| 2009/0182087 A1* | 7/2009 | Fudemoto ............... C08K 9/08 524/447 |
| 2011/0111308 A1* | 5/2011 | Halalay ............ H01M 10/0525 429/344 |
| 2011/0281173 A1 | 11/2011 | Singh et al. |
| 2012/0121989 A1 | 5/2012 | Roberts et al. |
| 2013/0063092 A1 | 3/2013 | Yang et al. |
| 2013/0130069 A1 | 5/2013 | Mullin et al. |
| 2013/0228950 A1 | 9/2013 | DeSimone et al. |
| 2013/0273419 A1 | 10/2013 | Pistorino et al. |
| 2014/0221689 A1 | 8/2014 | Klun et al. |
| 2016/0028114 A1 | 1/2016 | Pratt et al. |
| 2016/0093895 A1* | 3/2016 | Du ........................ H01M 6/168 429/405 |
| 2016/0211498 A1 | 7/2016 | Kim et al. |
| 2016/0221926 A1* | 8/2016 | Teran ...................... C07C 69/96 |
| 2016/0226101 A1* | 8/2016 | Teran ...................... C07C 69/96 |
| 2016/0226102 A1* | 8/2016 | Teran ...................... C07C 69/96 |
| 2016/0226103 A1* | 8/2016 | Teran ...................... C07C 69/96 |
| 2016/0329613 A1 | 11/2016 | Kusachi et al. |
| 2017/0117583 A1 | 4/2017 | Matsuno et al. |

FOREIGN PATENT DOCUMENTS

| | | |
|---|---|---|
| WO | 2010083325 A1 | 7/2010 |
| WO | 2011051275 A1 | 5/2011 |
| WO | 2014190278 A1 | 11/2014 |
| WO | 2014204547 A2 | 12/2014 |
| WO | 2015022229 A1 | 2/2015 |

OTHER PUBLICATIONS

International Search Report for PCT/US2016/025950, dated Jun. 27, 2016.
International Search Report for PCT/US2016/030602.
International Search Report for PCT/US2016/032541.
International Search Report for PCT/US2016/033967 dated Aug. 23, 2016.
Wong et a!.: Nonflammable perfluoropolyether-based electrolytes for lithium batteries. PNAS. 111, 9. 3327-3331; Mar. 4, 2014. [retrieved on May 18, 2016}. Retrieved from the Internet. <URL: http://www.pnas.org/contentl111/9/3327.full.pdf>. entire document.
Smart. "Improved performance of lithium-ion cells with the use of fluorinated carbonate-based electrolytes," Journal of Power Sources 119-121 (2003) 359-367.
Machine Translation of JP2009-206004A.

* cited by examiner

FLUORINATED ELECTROLYTES WITH NITRILE GROUPS

CROSS-REFERENCE TO RELATED APPLICATIONS

This application is a continuation of International Patent Application PCT/US2016/031685, filed May 10, 2016, which is incorporated by reference herein.

BACKGROUND OF THE INVENTION

Field of the Invention

This invention relates generally to electrolytes for use in electrochemical cells that employ alkali metals, and, more specifically, to fluorinated electrolytes for use in lithium-containing batteries.

Batteries based on lithium ion transfer work best with electrolytes that have high ionic conductivities and high stabilities. High ionic conductivities are useful because they facilitate ionic transfer, resulting in high power and low polarization. Highly stable batteries are those that are non-flammable and do not undergo undesired reactions with either anode or cathodes.

Perfluoropolyethers terminated with methoxycarbonyl groups have been reported as lithium ion electrolytes when formulated with lithium bis(trifluoromethane)sulfonimide. These electrolytes were reported to have excellent fire resistance and high lithium ion transference, though their ionic conductivities were not particularly high, at about $10^{-5}$ S cm$^{-1}$ at 80° C.

What is needed is an electrolyte that provides high lithium ion transference, excellent stability and high ionic conductivities to realize the full potential of lithium batteries that employ them.

SUMMARY

In the embodiments of the invention, as disclosed herein, an electrolyte is a mixture that includes perfluoropolyethers that have either one or two terminal nitrile groups covalently coupled thereto and an alkali metal salt. The alkali metal salt can be a lithium salt, a sodium salt, a potassium salt, or a cesium salt. The salt can make up between 5 and 30 wt % of the electrolyte composition.

In one embodiment of the invention, the perfluoropolyethers are selected from the group consisting of:

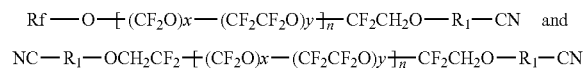

and combinations thereof. The variable x is the mole fraction of difluoromethyleneoxy groups in the perfluoropolyether, and x ranges between 0 and 1. The variable y is the mole fraction of tetrafluoroethyleneoxy groups in the perfluoropolyether, y is equal to (1−x) and y ranges between 0 and 1. The variable n is the average total number of randomly co-distributed difluoromethyleneoxy and tetrafluoroethyleneoxy groups in the perfluoropolyether, and n ranges between 1 and 50, between 1 and 100, between 1 and 1000, between 1 and 10,000, or any range subsumed therein. Rf is a perfluorinated C1-C8 straight alkyl group or a perfluorinated C1-C8 branched alkyl group.

In one arrangement, $R_1$ can be any of C1-C8 straight alkyl groups, C1-C8 branched alkyl groups, polyethers, and cyanoethyls. The polyethers may be any of 2-methoxyethyl and 2-(2-methoxy)ethoxy ethyl.

In one arrangement, $R_1$ is a C5-C8 heterocycloalkyl group that contains nitrogen, such as pyrrolidine, piperidine, morpholine, and 4-methylpiperazine.

In another embodiment of the invention, the perfluoropolyethers are selected from the group consisting of:

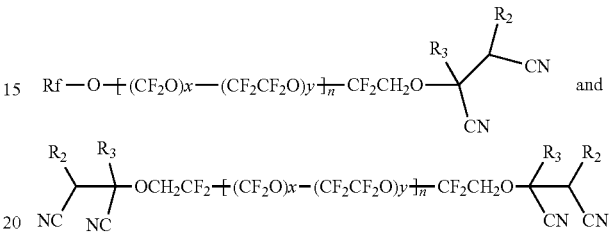

and combinations thereof. The variable x is the mole fraction of difluoromethyleneoxy groups in the perfluoropolyether, and x ranges between 0 and 1. The variable y is the mole fraction of tetrafluoroethyleneoxy groups in the perfluoropolyether, y is equal to (1−x) and y ranges between 0 and 1. The variable n is the average total number of randomly co-distributed difluoromethyleneoxy and tetrafluoroethyleneoxy groups in the perfluoropolyether and n ranges between 1 and 50, between 1 and 100, between 1 and 1000, between 1 and 10,000, or any range subsumed therein. Rf is a perfluorinated C1-C8 straight alkyl group or a perfluorinated C1-C8 branched alkyl group.

In one arrangement, $R_2$ and $R_3$ are each selected independently from the group consisting of —CN, —H, C1-C8 straight alkyl groups, C1-C8 branched alkyl groups, polyethers, and cyanoethyls.

In one arrangement, $R_2$ and/or $R_3$ is a C5-C8 heterocycloalkyl group that contains nitrogen, such as pyrrolidine, piperidine, morpholine, and 4-methylpiperazine.

In one arrangement, one or both of $R_2$ and $R_3$ is hydrogen.

In another embodiment of the invention, an electrochemical cell is disclosed. The electrochemical cell has an anode, a cathode; and an electrolyte between the anode and the cathode. The electrolyte is in ionic communication with both the anode and the cathode. The electrolyte comprises a mixture of perfluoropolyethers, each having either one or two terminal nitrile groups covalently coupled thereto and an alkali metal salt.

The anode may be any of lithium metal and alloys, graphite, lithium titanante, silicon, silicon alloys, and combinations thereof.

The cathode may be any of nickel cobalt aluminum oxide (NCA), nickel cobalt manganese oxide (NCM), LiCoO$_2$, LiFePO$_4$, LiMnPO$_4$, LiNiPO$_4$, LiCoPO$_4$, LiNi$_{0.5}$Mn$_{1.5}$O$_4$, Li$_2$MnSiO$_4$, Li$_2$FeSiO$_4$ and LiMn$_2$O$_4$ particles, and combination thereof.

In another embodiment of the invention, another electrochemical cell is disclosed. The electrochemical cell has an anode configured to absorb and release lithium ions, a cathode comprising cathode active material particles, an electronically-conductive additive, a catholyte, and an optional binder material, a current collector adjacent to an outside surface of the cathode, and a separator region between the anode and the cathode. In the separator region there is a separator electrolyte configured to facilitate movement of lithium ions back and forth between the anode and the cathode. The cathode contains a mixture of perfluoropolyethers, each having either one or two terminal nitrile groups covalently coupled thereto and an alkali metal salt.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
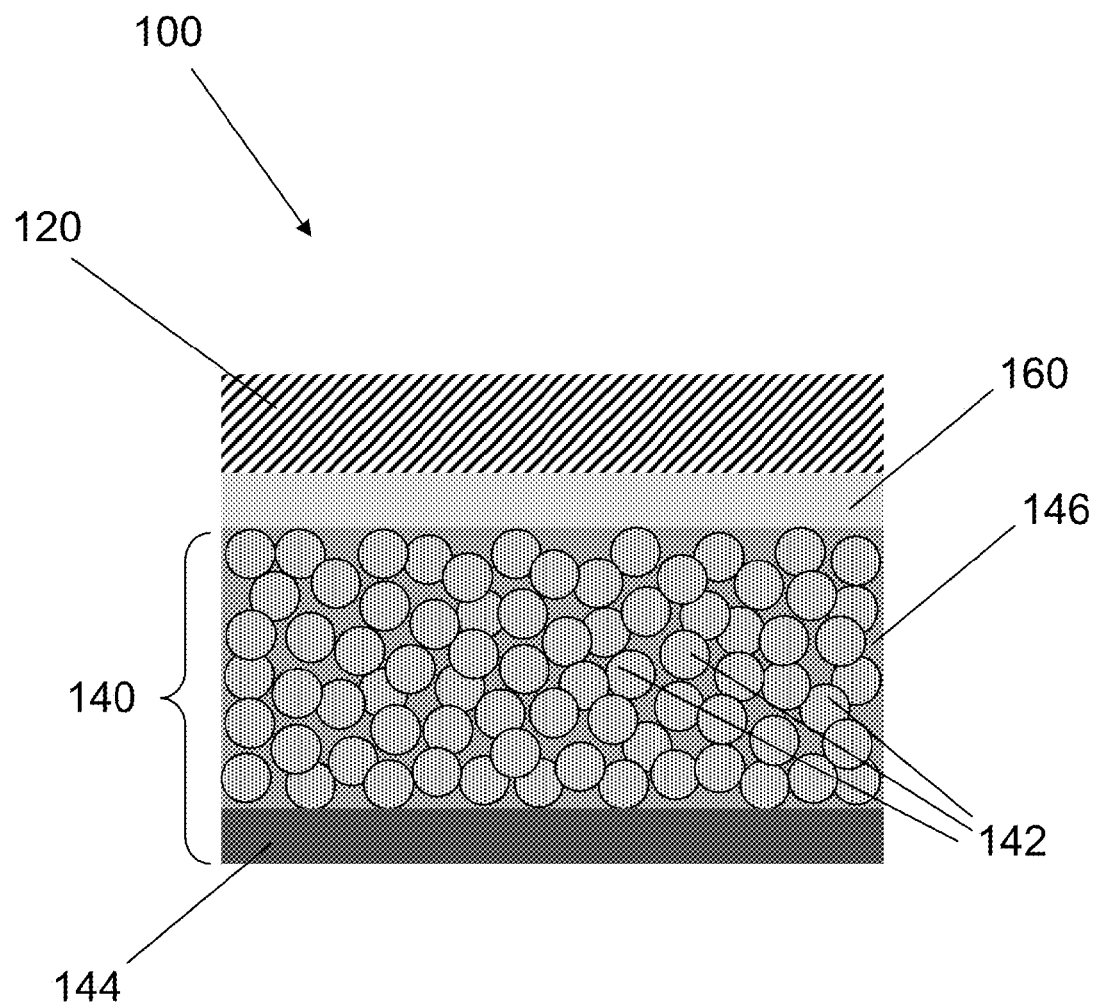
FIG. 1 is a schematic illustration of one configuration of a lithium battery cell that contains a catholyte, according to an embodiment of the invention.

The aforementioned needs are satisfied by the process of the present invention which describes perfluoropolyether electrolytes terminated with nitrile groups such as 2-cyanoethoxy, which show enhanced ionic conductivities when formulated with lithium bis(trifluoromethane)sulfonimide, making them useful as lithium cell electrolytes.

Examples of fluoropolymers and perfluoropolymers include but are not limited to fluoropolyethers and perfluoropolyethers, poly(perfluoroalkyl acrylate), poly(perfluoroalkyl methacrylate), polytetrafluoroethylene, polychlorotrifluoroethylene, and polyvinylidene fluoride, and copolymers thereof.

Examples of perfluoropolyethers include but are not limited to polymers that include a segment such as a difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-cohexafluoropropylene oxide-co-difluoromethylene oxide segments and combinations thereof.

A terminal group consisting of an oxygen-carbonyl link (O—C(=O)) is known as a carbonate group. Perfluoropolyethers terminated with carbonate groups are compounds that may be generally referred to as carbonate-terminated perfluoropolyethers.

As stated above, perfluoropolyethers terminated with methoxycarbonyl (MC) groups have been reported as lithium ion electrolytes when formulated with lithium bis(trifluoromethane)sulfonimide. Examples of these are shown below.

(1)

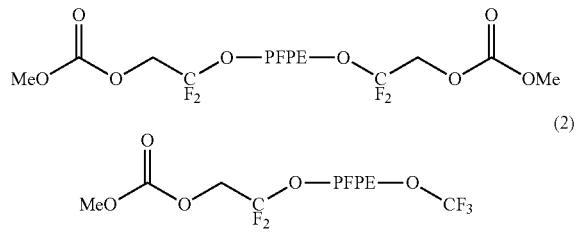

(2)

-continued

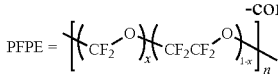

The methyl carbonate termini of these polymers enhance the solubility of lithium salt in the electrolyte when compared to the diol precursors. However, linear carbonate groups do not make an inherently good solvent for salts: as analogues, solvents such as dimethyl carbonate and diethyl carbonate have almost no ability to dissolve lithium salts. Therefore it is likely that other functional groups may provide better salt solubilities and higher ionic conductivities.

Polarity refers to a separation of electric charge leading to a molecule or its chemical groups having an electric dipole or multipole moment. Polar molecules interact through dipole-dipole intermolecular forces and hydrogen bonds. Molecular polarity is dependent on the difference in electronegativity between atoms in a compound and the asymmetry of the compound's structure. Polarity underlies a number of physical properties including surface tension, solubility, and melting and boiling-points. Polar groups can also facilitate dissociation of lithium salts in an electrolyte; the better the dissociation of lithium salts, the higher the ionic conductivity in the electrolyte. The linear carbonate group is not inherently strongly polar and its presence does not enhance the solubility of salts, a property crucial for electrolytes. Incorporation of one or more polar groups, such as nitrile groups, imparts a higher polarity and results in better salt solubility.

The nitrile group differs from the methyl carbonate group by substitution of a cyanol group. The nitrile group is strongly electron withdrawing, making it more polar. The effect of a nitrile group as compared to carbonate group is more easily appreciated in small molecules of similar formula weight, such as aldehyde, which does not have a nitrile group, and alkyl nitrile, which does have a nitrile group, which are shown below. Acetaldehyde has a boiling point at 21° C., has modest miscibility with water, and is a poor solvent for salts. Propionitrile has a much higher boiling point at 97° C. and is a good organic solvent for salts. Thus salts are more likely to be dissolved and mobile in perfluoropolyethers terminated with nitrile groups than in perfluoropolyethers terminated with methyl carbonate groups. This reflects the advantage of using nitrile groups over methyl carbonate groups to terminate perfluoropolyethers for use as electrolytes. Nitrile-terminated perfluoropolyethers can dissolve appreciable amounts of lithium salts, which make them useful as electrolytes.

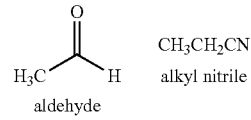

Polyacrylonitrile has been used as an electrolyte in lithium battery applications and has shown good solubility of Li salts. It is also more likely for the nitrile-terminated perfluoropolyethers to dissolve appreciable amounts of different lithium salts, in addition to LiTFSI, which can be useful when formulating electrolytes.

Some new materials made from perfluoropolyethers terminated with nitrile groups have been synthesized and have been found to provide high ionic conductivities. This represents a new class of compounds that can be especially useful as lithium ion electrolytes.

This new class of compounds can be generalized as any of the following chemical structures. The first two are terminated by a nitrile group at one (3) or both (4) ends. The second two are terminated by multiple nitrile groups at one (5) or both (6) ends.

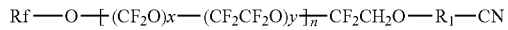
(3)

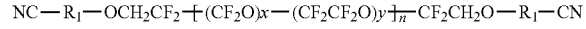
(4)

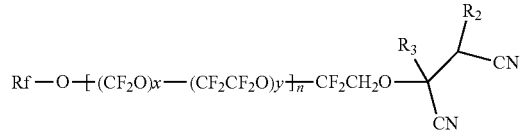
(5)

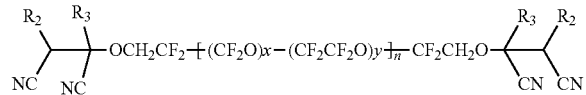
(6)

wherein x (0≤x≤1) is the mole fraction of difluoromethyleneoxy groups in the perfluoropolyether and y=(1−x) (0≤y≤1) is the mole fraction of tetrafluoroethyleneoxy groups in the perfluoropolyether. The variable n is the average total number of randomly co-distributed difluoromethyleneoxy and tetrafluoroethyleneoxy groups in the perfluoropolyether and n ranges between 1 and 50, between 1 and 100, between 1 and 1000, between 1 and 10,000, or any range subsumed therein. Rf is a perfluorinated C1-C8 straight or branched alkyl group.

In one arrangement, the $R_1$, $R_2$, and $R_3$ substituents are each chosen independently from —CN, —H, or C1-C8 straight alkyl groups, C1-C8 branched alkyl groups, polyethers such as 2-methoxyethyl and 2-(2-methoxy) ethoxyethyl, or cyanoethyl. In another arrangement, $R_1$, $R_2$, and/or $R_3$ is a C5-C8 heterocycloalkyl group that contains nitrogen, such as pyrrolidine, piperidine, morpholine, and/or 4-methylpiperazine. In yet another arrangement, $R_2$ and/or $R_3$ is hydrogen.

In one embodiment of the invention, one or more electrolyte salts are added to the perfluoropolyethers described herein to enhance their use as electrolytes. Examples of salts that can be used include, but are not limited to, alkali metal salts such as lithium salts, sodium salts, potassium salts, and cesium salts. Examples of lithium salts include, but are not limited to, LiTFSI, $LiPF_6$, $LiBF_4$, Li(BOB), $LiClO_4$, LiBETI, and LiTCB. Concentration of alkali metal salts in the electrolytes disclosed herein range from 5 to 50 wt %, 5 to 30 wt %, 10 to 20 wt %, or any range subsumed therein.

Nitrile-terminated perfluoropolyether compounds maintain many of the advantages of perfluoropolyethers as electrolytes that have been previously cited, including low flammability and vapor pressure (for safety and convenience), low melting point (enabling use at low temperatures, even below 0° C.), and electrochemical inertness over a wide voltage range (appropriate for use in an electrochemical device).

In one embodiment of the invention, one or more of the electrolytes disclosed herein is used in an electrochemical cell, such as a battery. The cell has an anode, a cathode, and the electrolyte between the anode and the cathode. The electrolyte provides ionic communication between the anode and the cathode. In one arrangement, the anode is made of lithium metal or alloys, graphite, lithium titanate, silicon and/or a silicon alloy. In one arrangement, the cathode is made of a material such as nickel cobalt aluminum oxide (NCA), nickel cobalt manganese oxide (NCM), $LiCoO_2$, $LiFePO_4$, $LiMnPO_4$, $LiNiPO_4$, $LiCoPO_4$, $LiNi_{0.5}Mn_{1.5}O_4$, $Li_2MnSiO_4$, $Li_2FeSiO_4$ and $LiMn_2O_4$ particles, and any combination thereof In another embodiment of the invention, the electrolytes disclosed herein are used as catholytes in lithium battery cells. With reference to FIG. 1, a lithium battery cell 100 has an anode 120 that is configured to absorb and release lithium ions. The anode 120 may be a lithium or lithium alloy foil or it may be made of a material into which lithium ions can be absorbed such as graphite or silicon. The lithium battery cell 100 also has a cathode 140 that includes cathode active material particles 142, an electronically-conductive additive (not shown), a current collector 144, a catholyte 146, and an optional binder (not shown). The catholyte 146 may be any of the electrolytes disclosed herein. There is a separator region 160 between the anode 120 and the cathode 140. The separator region 160 contains a separator electrolyte that facilitates movement of lithium ions (or another metal ions that form the basis of the cell) back and forth between the anode 120 and the cathode 140 as the cell 100 cycles. The separator region 160 may include any separator electrolyte that is suitable for such use in a lithium battery cell. In one arrangement, the separator region 160 contains a porous plastic material that is soaked with a liquid electrolyte, as would be known by a person with ordinary skill in the art. In another arrangement, the separator region 160 contains a viscous liquid or gel electrolyte. In another arrangement, the separator region 160 contains a solid polymer electrolyte. Examples of such solid polymer electrolytes are discussed in more detail below.

Figure 2:
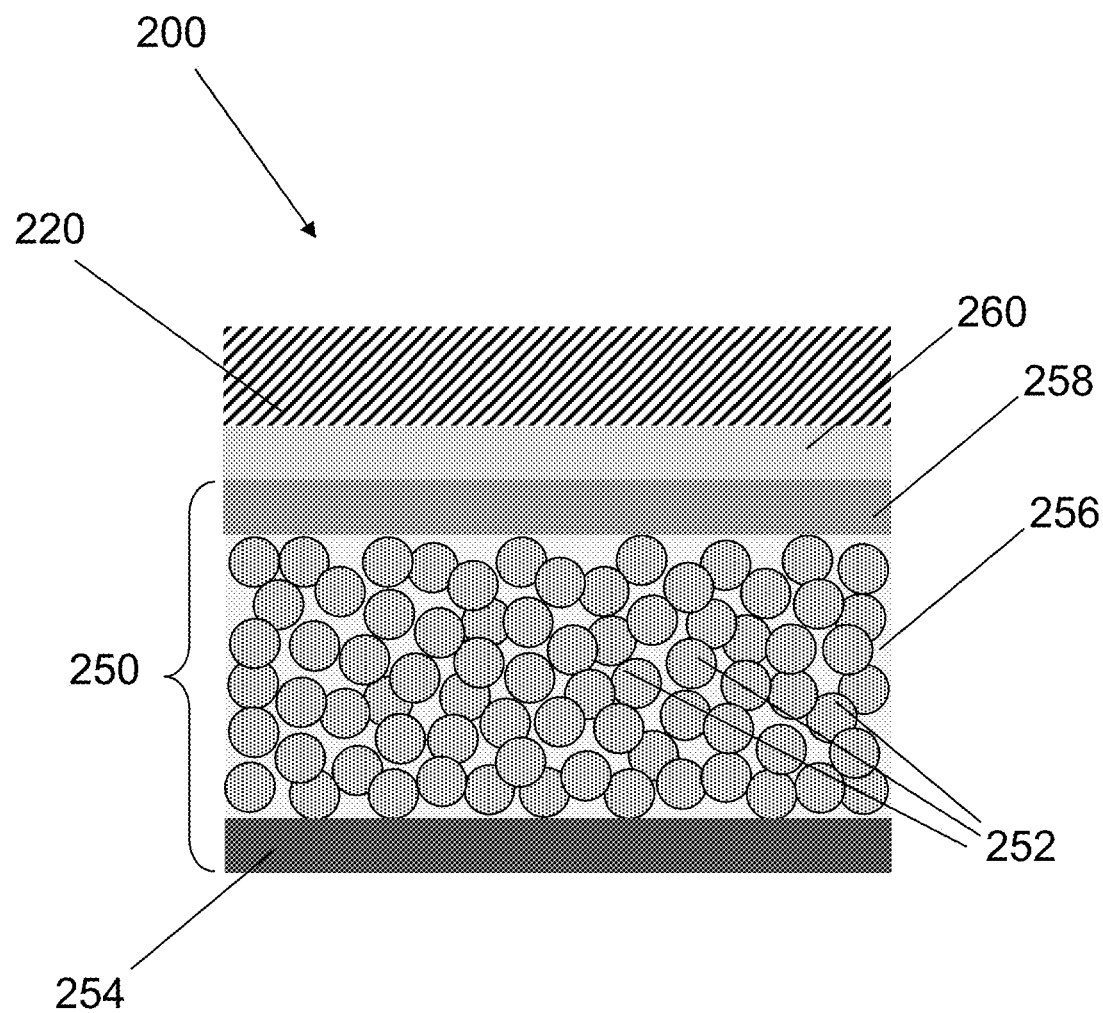
FIG. 2 is a schematic illustration of another configuration of a lithium battery cell that contains a catholyte and a cathode overlayer, according to an embodiment of the invention.

In another embodiment of the invention, a battery cell with a second configuration is described. With reference to FIG. 2, a lithium battery cell 200 has an anode 220 that is configured to absorb and release lithium ions. The anode 220 may be a lithium or lithium alloy foil or it may be made of a material into which lithium ions can be absorbed such as graphite or silicon. The lithium battery cell 200 also has a cathode 250 that includes cathode active material particles 252, an electronically-conductive additive (not shown), a current collector 254, a catholyte 256, an optional binder (not shown), and an overcoat layer 258. The catholyte 146 may be any of the electrolytes disclosed herein. There is a separator region 260 between the anode 220 and the cathode 250. The separator region 260 contains a separator electrolyte that facilitates movement of lithium ions back and forth between the anode 220 and the cathode 250 as the cell 200 cycles. The separator region may include any electrolyte that is suitable for such use in a lithium battery cell, as described above. If the separator electrolyte is liquid, it may be useful to include an overcoat layer 280 between the cathode 250 and the separator region 260 to prevent mixing of the catholyte 256 and the separator electrolyte. In one arrangement, the overcoat layer 280 is a solid electrolyte that is compatible with both the catholyte 256 and the separator electrolyte.

Figure 3:
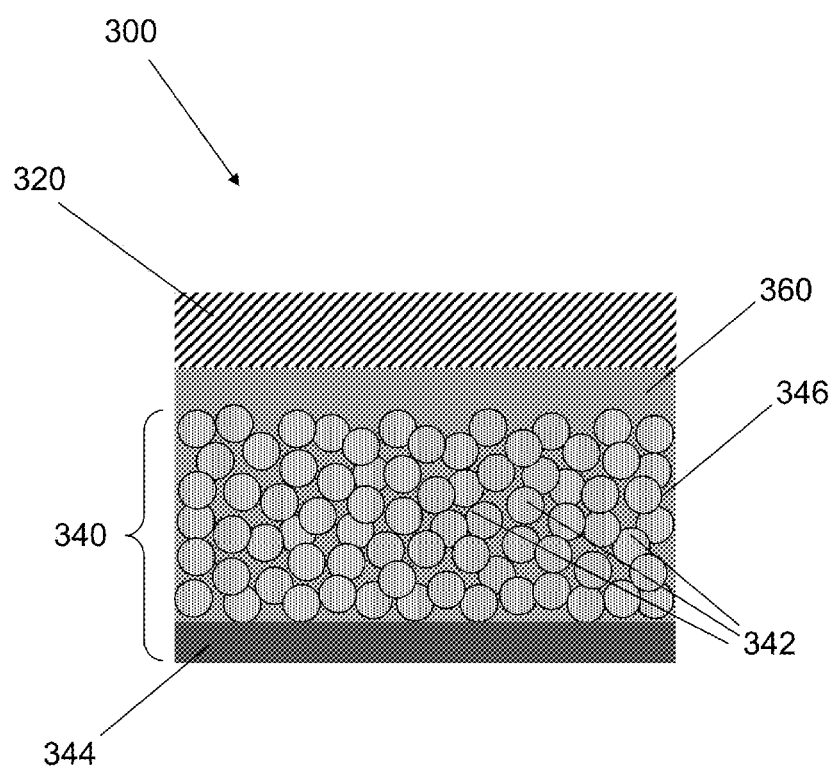
FIG. 3 is a schematic illustration of another configuration of a lithium battery cell that contains a catholyte, according to an embodiment of the invention.

In another embodiment of the invention, a battery cell with a third configuration is described. With reference to FIG. 3, a lithium battery cell 300 has an anode 320 that is configured to absorb and release lithium ions. The anode 320 may be a lithium or lithium alloy foil or it may be made of a material into which lithium ions can be absorbed such as graphite or silicon. The lithium battery cell 300 also has a cathode 340 that includes cathode active material particles 342, an electronically-conductive additive (not shown), a current collector 344, a catholyte 346, and an optional binder (not shown). The catholyte 346 may be any of the electrolytes disclosed here. There is a separator region 360 between the anode 320 and the cathode 340. The catholyte 346 extends into the separator region 360 and acts as both catholyte and separator electrolyte. In one arrangement, the separator region 360 contains a porous plastic material that can be soaked with a liquid catholyte 346.

With respect to the embodiments discussed in FIGS. 1, 2, and 3, a solid polymer electrolyte for use in separator regions 160, 260, 360 may be any such electrolyte that is appropriate for use in a Li battery. Of course, many such electrolytes also include electrolyte salt(s) that help to provide ionic conductivity. Examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. The linear polymers can also be used in combination as graft copolymers with polysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (pxe), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state. Further information about such block copolymer electrolytes can be found in U.S. Pat. No. 9,136,562, issued Sep. 15, 2015, U.S. Pat. No. 8,889,301, issued Nov. 18, 2014, U.S. Pat. No. 8,563,168, issued Oct. 22, 2013, and U.S. Pat. No. 8,268,197, issued Sep. 18, 2012, all of which are included by reference herein.

With respect to the embodiments discussed in FIGS. 1, 2, and 3, suitable cathode active materials include, but are not limited to, nickel cobalt aluminum oxide (NCA), nickel cobalt manganese oxide (NCM), $LiCoO_2$, $LiFePO_4$, $LiMnPO_4$, $LiNiPO_4$, $LiCoPO_4$, $LiNi_{0.5}Mn_{1.5}O_4$, $Li_2MnSiO_4$, $Li_2FeSiO_4$ and $LiMn_2O_4$ particles, and any combination thereof. Suitable electronically-conductive additives include, but are not limited to, carbon black, graphite, vapor-grown carbon fiber, graphene, carbon nanotubes, and combinations thereof. Suitable anode materials include, but are not limited to, lithium metal and lithium alloys, graphite, lithium titanate, silicon and/or a silicon alloy. A binder can be used to hold together the cathode active material particles and the electronically conductive additive. Suitable binders include, but are not limited to, PVDF (polyvinylidene difluoride), PVDF-HFP (poly(vinylidene fluoride-co-hexafluoropropylene), PAN (polyacrylonitrile), PAA (polyacrylic acid), PEO (polyethylene oxide), CMC (carboxymethyl cellulose), and SBR (styrene-butadiene). In one arrangement, the anode is made of lithium metal and alloys, graphite, lithium titanate, silicon and/or a silicon alloy.

EXAMPLES

The following examples provide details relating to composition, fabrication and performance characteristics of lithium ion electrolytes in accordance with the present invention. It should be understood the following is representative only, and that the invention is not limited by the detail set forth in these examples.

Synthesis of Dinitrile-terminated Perfluoropolyether (4):

8.2 g 1H,1H,11H,11H-Perfluoro-3,6,9-trioxaundecan-1,11-diol was dissolved in 50 ml dried acetonitrile at room temperature, and 0.8 ml of 1M tBuOK THF solution was added under Ar. The solution was stirred at room temperature for 10 min under Ar. Acrylonitrile (21.2 g (0.4 mol)) was added, and the solution was heated to 55° C. under Ar for 20 hrs. A rotary evaporator was used to remove solvent and excess acrylonitrile from the solution. Column purification yielded 3 g colorless oil of dinitrile-terminated perfluoropolyether product, as identified by $^1$H- and $^{19}$F-NMR methods.

Scheme: Synthesis of 4

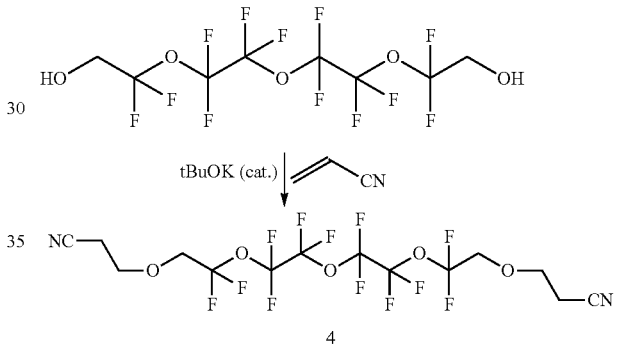

This general synthetic method can also be applied to fluorinated diols and fluorinated alcohols with various chain lengths to incorporate nitrile group(s) into fluorinated alcohols.

Electrolytes Made from New Materials.

Electrolyte solutions were formed by dissolving 10 wt % lithium bis(trifluoromethane) sulfonimide (LiTFSI) in the appropriate liquid which are functionalized PFPE compounds. Ionic conductivities of the electrolytes were measured by constructing symmetric coin cells with porous polyolefin separators soaked through with LiTFSI solution and performing electrochemical impedance spectroscopy. The results are shown below in Table I. Conductivity results for methyl carbonate-terminated perfluoropolyethers 1 and 2 are shown for comparison.

TABLE I

| Ionic conductivities of perfluoropolyether-LiTFSI electrolytes | |
|---|---|
| Electrolyte (with 10 wt % LiTFSI) | Conductivity at 80° C. (S cm$^{-1}$) |
| 1 | $1.5 \times 10^{-5}$ |
| 2 | $1.5 \times 10^{-5}$ |
| 4 | $1.1 \times 10^{-3}$ |

Thus, nitrile-terminated electrolytes (4) have ionic conductivities roughly two orders of magnitude greater than those of the methyl carbonate-terminated electrolytes (1 and 2) under similar conditions.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrolyte, comprising:
a mixture of
perfluoropolyethers, each having either one or two terminal nitrile groups covalently coupled thereto; and
an alkali metal salt;
wherein the perfluoropolyethers are selected from the group consisting of:

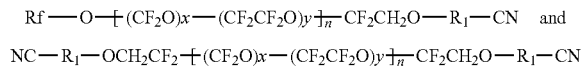

and combinations thereof, and
wherein x is the mole fraction of difluoromethyleneoxy groups in the perfluoropolyether, and x ranges between 0 and 1;
y is the mole fraction of tetrafluoroethyleneoxy groups in the perfluoropolyether, y is equal to (1−x) and y ranges between 0 and 1;
n is the average total number of randomly co-distibuted difluoromethyleneoxy and tetrafluoroethyleneoxy groups in the perfluoropolyether, and n ranges between 1 and 50;
Rf is a perfluorinated C1-C8 straight alkyl group or a perfluorinated C1-C8 branched alkyl group; and
$R_1$ is selected from the group consisting of C1-C8 straight alkyl groups, C1-C8 branched alkyl groups, polyethers, cyanoethyls, pyrrolidine, piperidine, morpholine, 4-methylpiperazine, and C5-C8 heterocycloalkyl groups that contain nitrogen.

2. The electrolyteof claim 1, wherein the alkali metal salt is a lithium salt.

3. The electrolyte of claim 1, wherein the alkali metal salt is a sodium salt.

4. The electrolyte of claim 1, wherein the alkali metal salt comprises between 5 to 30 wt % of the electrolyte.

5. The electrolyte of claim 1 wherein the polyethers are selected from the group consisting of 2-methoxyethyl and 2-(2-ethoxy)ethoxyethyl.

6. An electrolyte composing:
a mixture of:
perfluoropolyethers, each having one or two terminal nitrile groups covalently coupled thereto; and
an alkali metal salt;
wherein the perfluoropolyethers are selected from the group consisting of:

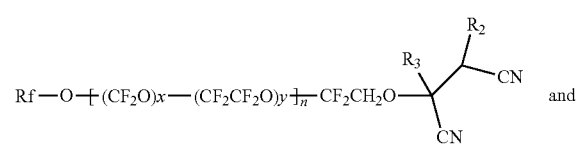

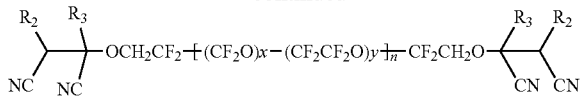

and combinations thereof, and
wherein x is the mole fraction of difluoromethyleneoxy groups in the perfluoropolyether, and x ranges between 0 and 1;
y is the mole fraction of tetrafluoroethyleneoxy groups in the perfluoropolyether, y is equal to (1−x) and y ranges between 0 and 1;
n is the average total number of randomly co-distributed difluoromethyleneoxy and tetrafluoroethyleneoxy groups in the perfluoropolyether and n ranges between 1 and 50; and
Rf is a perfluorinated C1-C8 straight alkyl group or a perfluorinated C1-C8 branched alkyl group; and
$R_2$ and $R_3$ are each selected independently from the group consisting of —CN, C1-C8 straight alkyl groups, C1-C8 branched alkyl groups, polyethers, cyanoethyls, hydrogen, pyrrolidine, piperidine, morpholine, 4-methylpiperazine, and C5-C8 heterocycloalkyl groups that contain nitrogen.

7. An electrochemical cell, comprising:
an anode;
a cathode; and
an electrolyte between the anode and the cathode, the electrolyte in ionic communication with both the anode and the cathode;
wherein the electrolyte comprises:
the electrolyte of claim 1 or the electrolyte of claim 6.

8. The cell of claim 7, wherein the anode comprises a material selected from the group consisting of lithium metal and alloys, graphite, lithium titanante, silicon, silicon alloys, and combinations thereof.

9. The cell of claim 7, wherein the cathode comprises a material selected from the group consisting of nickel cobalt aluminum oxide (NCA), nickel cobalt manganese oxide (NCM), $LiCoO_2$, $LiFePO_4$, LiMnPO4, $LiNiPO_4$, $LiCoPO_4$, $LiNi_{0.5}Mn_{1.5}O_4$, $Li_2MnSiO_4$, $Li_2FeSiO_4$ and $LiMn_2O_4$ particles, and combination thereof.

10. An electrochemical cell, comprising:
an anode configured to absorb and release lithium ions;
a cathode comprising cathode active material particles, an electronically-conductive additive, a catholyte, and an optional binder material;
a current collector adjacent to an outside surface of the cathode; and
a separator region between the anode and the cathode, the separator region comprising a separator electrolyte configured to facilitate movement of lithium ions back and forth between the anode and the cathode;
wherein the catholyte comprises:
the electrolyte of claim 1 or the electrolyte of claim 6.

11. The electrolyte of claim 6, wherein the alkali metal salt is a lithium salt.

12. The electrolyte of claim 6, wherein the alkali metal salt is a sodium salt.

13. The electrolyte of claim 6, wherein the alkali metal salt comprises between 5 to 30 wt % of the electrolyte.

* * * * *